United States Patent Office 3,574,716
Patented Apr. 13, 1971

3,574,716
HYDROGENATION OF ALDEHYDES AND KETONES
Robert Stevenson Coffey, Norton-on-Tees, England, assignor to Imperial Chemical Industries Limited, London, England
No Drawing. Continuation-in-part of application Ser. No. 555,215, June 6, 1966. This application July 2, 1968, Ser. No. 741,859
Claims priority, application Great Britain, June 11, 1965, 24,771/65
Int. Cl. C07c 29/14, 67/00
U.S. Cl. 260—494                                    11 Claims

ABSTRACT OF THE DISCLOSURE

Olefinic or acetylenic compounds, aldehydes or ketones are hydrogenated by hydrogen in the presence of an iridium complex of formula $IrHY_2L_n$, in which Y is hydrogen or an anionic element or group such as carboxylate, L is a ligand such as a trialkyl or aryl phosphine, and $n$ is 2 or 3.

---

This application is a continuation-in-part of copending U.S. application Ser. No. 555,215, filed June 6, 1966.

The invention relates to a hydrogenation process, in particular to the hydrogenation of olefine or acetylene compounds or aldehydes or ketones.

According to the invention a hydrogenation process comprises contacting an olefine or acetylene compound, an aldehyde or ketone with hydrogen in the presence of an iridium complex of formula $IrHY_2L_n$ in which, $n$ is 2 or 3,
one Y is hydrogen or the group (OOC.R) the other Y being hydrogen or an anionic element or group,
L is a ligand, both L groups being $Z(R_1R_2R_3)$ when $n=2$ and at least two L groups being $Z(R_1R_2R_3)$ when $n=3$ the remaining L group being CO or $Z(R_1R_2R_3)$,
Z is phosphorus, arsenic or antimony,
R, $R_1$, $R_2$ and $R_3$ are alkyl, cycloalkyl, aryl, alkaryl, aralkyl, alkenyl, cyclo-alkenyl, alkoxy, arloxy or heterocyclic groups.

The anionic element or group Y may be a halogen, e.g., chlorine, cyanide or, preferably, a carboxylate group such as a monoalkanoate containing two to six carbon atoms. A particularly preferred carboxylate is an acetate group.

The group (OOC.R) is a carboxylate group and is preferably a carboxylate derived from an aliphatic monocarboxylic acid containing 2 or more carbon atoms. The lower aliphatic mono-carboxylic acids are particularly suitable, e.g., acids containing two to six carbon atoms such as acetic acid.

$R_1$, $R_2$ and $R_3$, which may be the same or different, are preferably alkyl groups, particularly alkyl groups having from 1 to 12 carbon atoms such as methyl, ethyl, isopropyl, n-propyl, n-butyl and iso-butyl. Preferred aryl groups are phenyl groups while suitable aralkyl groups and heterocyclic groups include benzyl and pyridyl groups respectively.

Examples of iridium complexes for use in the invention are $IrH_2(OOC.CH_3)(P.Ph_3)_3$, $IrH_2(OOC.CH_3)(P.Ph_3)_2CO$,
$IrH(OOC.CH_3)_2(P.Ph_3)_3$, $IrH_2(OOC.C_2H_5)(AsPh_3)_2$,
$IrH_3(PEt_2Ph)_2$, $IrH_3(P.Ph_3)_2$ and $IrH_3(P.Ph_3)_3$ The hydrogenation process may be carried out under elevated pressure of hydrogen, e.g., up to 100 atmospheres and at elevated temperatures. It is a particular advantage of the process however that it may be carried out effectively at one atmosphere hydrogen pressure and a temperature in the range 20° to 130° C. preferably 20° to 80° C. The iridium complex is used in catalytic amounts, e.g., a concentration in the range $10^{-5}$ to $10^{-1}$ molar, preferably $10^{-4}$ to $10^{-1}$ molar.

Mono-, di- and polyolefinic and acetylenic compounds may be hydrogenated by the process of the present invention. In particular olefines containing up to 20 carbon atoms may be used. Suitable olefinic and acetylenic compounds include compounds containing carboxylate, nitrile and carbonyl groups, e.g., acrylates and acrylonitriles. Aldehydes and ketones which may be hydrogenated by the present process include those containing up to 20 carbon atoms, particularly mixtures of saturated aldehydes containing 4 to 14 carbon atoms obtained by the OXO process.

When the catalyst is of formula $IrHY(OOC.R)L_n$ the process of the invention is advantageously carried out in the presence of a carboxylic acid containing at least 2 carbon atoms which may conveniently act as a solvent. Preferably, the acid is a lower aliphatic mono-carboxylic acid containing two to six carbon atoms and most preferably is acetic acid. The use of a carboxylic acid enables the catalysts to be prepared in situ if so desired for by adding a compound of formula $IrH_3L_n$ to the carboxylic acid, iridium complexes of formula $IrH_2(OOC.R)L_n$ and $IrH(OOC.R)_2L_n$ are obtained. For example very effective catalyst systems are obtained by adding an iridium complex such as $IrH_3(P.Ph_3)_3$, to acetic acid when a catalyst comprising a mixture of iridium complexes is obtained.

The process described in the preceding paragraph is particularly effective for the hydrogenation of both aliphatic and aromatic aldehydes and ketones although somewhat severer conditions are required for ketones than for aldehydes. Suitable aldehydes and ketones include saturated aliphatic aldehydes and ketones containing up to 20 carbon atoms, particularly 4 to 14 carbon atoms, e.g., butyraldehyde, hexaldehyde, heptaldehyde, decaldehyde and methyl ethyl ketone. Although in general olefinic and acetylenic double bonds are not hydrogenated by such catalysts at one atmosphere hydrogen pressure and temperatures in the range 20° to 80° C., hydrogenation of such bonds does take place if they are terminal bonds which are activated by a suitable group such as a carbonyl group, as for example in acrolein, acrylic acid and methyl acrylate.

The process using a catalyst of formula $$IrHY(OOC.R)L_n$$

in the presence of a carboxylic acid is useful therefore for the selective hydrogenation of mixtures of aldehydes and olefines such as are obtained in the OXO process, e.g., mixtures of straight and branched chain saturated aldehydes containing 4 to 14 carbon atoms. The aldehydes are reduced to the corresponding alcohols leaving the olefines unchanged and hence available for reuse.

The process will now be further described with reference to the following examples.

EXAMPLE 1

A solution of $IrH_3(P.Ph_3)_3$ ($5.65 \times 10^{-3}$ molar) in acetic acid, i.e. containing the complexes $IrH(OOCCH_3)_2(P.Ph_3)_3$ and $IrH_2(OOCCH_2)(P.Ph_3)_3$ was stirred unde hydrogen at 50° C. for 20 minutes, n-Butyraldehyde was then added to make a 0.82 molar concentration. Hydrogen was absorbed at a rate of 0.54 mole per litre per hour and in under three hours 88% of the aldehyde was converted to a mixture of n-butanol and n-butyl acetate. The products were identified by gas-liquid chromatography and nuclear magnetic resonance spectroscopy.

EXAMPLE 2

Example 1 was repeated using $4.71 \times 10^{-3}$ molar $IrH_3(P.Ph_3)_3$ and 0.82 molar butyraldehyde. The hydrogen uptake was 0.46 mole/litre/hour. When 24.2% of the theoretical hydrogen had been absorbed the reaction was stopped and the acetic acid distilled off under reduced pressure. The complexes remaining were found to be identical with those obtained by refluxing $IrH_3(P.Ph_3)_3$ in acetic acid.

EXAMPLE 3

$IrH_3(P.Ph_3)_3$ as a hydrogenation catalyst (a) Under 1 atmosphere pressure.—A $5.7 \times 10^{-3}$ molar solution of $IrH_3(P.Ph_3)_3$ in benzene (25 cc.) and octene-1 (20 cc.) was heated to reflux and stirred with a cruciform stirrer attached to a gas burette containing hydrogen gas. During ten hours, approximately 800 cc. of hydrogen gas were absorbed. The product was analysed by vapour phase chromatography to show the presence of n-octane.

(b) At 100 atmospheres pressure of hydrogen.—10 cc. of each of the compounds listed in the table below was shaken in an autoclave at 100 atmospheres of hydrogen and 100° C. for 15 hours with a solution of $IrH_3(P.Ph_3)_3$ (0.2 g.) in benzene (20 cc.).

The products obtained are shown in the table.

Table

| Starting material: | Product |
| --- | --- |
| Octene-1 | Octane |
| Octene-2 | Octane |
| Hexanone-2 | Hexanol-2 |
| Acetone | iso-Propanol |
| Mesityl oxide | 4-methylpentanol-2 |
| Di-isobutylene | Octane |
| Acrylonitrile | Propionitrile |

EXAMPLE 4

$IrH_3(PEt_2Ph)_2$ as a hydrogenation catalyst

A solution of $IrH_3(PEt_2Ph)_2$ (0.1 g.) in octene-1 (1 g.) and benzene (5 cc.) was shaken at room temperature in an atmosphere of hydrogen. Over a period of five hours 80 cc. of hydrogen were absorbed. Octane was determined in the product of the hydrogenation by vapour phase chromatographic analysis.

EXAMPLE 5

$IrH_3(P.Ph_3)_2$ as a hydrogenation catalyst

A $5.7 \times 10^{-3}$ molar solution of $IrH_3(P.Ph_3)_2$ in benzene (25 cc.) and octene-1 (20 cc.) was heated to reflux (85°–90° C.) and stirred with a cruciform stirrer attached to a gas burette containing hydrogen gas. Over a period of 400 minutes 700 cc. of hydrogen gas were absorbed. The product was analysed by vapour phase chromatography to show the presence of n-octane. No octene-1 was detected.

The above was repeated replacing the octene-1 by 20 cc. 1,5-cyclo-octadiene. After 265 minutes 606 cc. of hydrogen had ben adsorbed. Vapour phase chromatographic analysis showed the presence of cyclo-octene.

EXAMPLE 6

$IrH_3(P.Ph_3)_3$ as a hydrogenation catalyst

Following the procedure described in Example 3(b), $IrH_3(P.Ph_3)_3$ was found to catalyse the hydrogenation of phenyl acetylene to ethyl benzene and styrene.

Following the procedure of Example 3(a) however, $IrH_3(P.Ph_3)_3$ was found to hydrogenate terminal double bonds (primary olefine), e.g. octene-1, but not nonterminal double bonds (secondary olefine), e.g. octene-2. This is in contrast to $IrH_3(P.Ph_3)_2$ which will hydrogenate nonterminal double bonds under the relatively milder conditions described in Example 3(a).

What is claimed is:

1. A hydrogenation process comprising contacting a saturated hydrocarbon aldehyde or ketone of up to 20 carbon atoms with hydrogen in the presence of an iridium complex of formula $IrHY_2L_n$ in which, $n$ is 2 or 3,
   one Y is hydrogen or the group (OOC.R) the other Y being hydrogen, halogen, cyanide or carboxylate derived from a hydrocarbon aliphatic mono-carboxylic acid containing 2 or more carbon atoms,
   L is a ligand both L groups being $Z(R_1R_2R_3)$ when $n=2$ and at least two L groups being $Z(R_1R_2R_3)$ when $n=3$ the remaining L groups being CO or $Z(R_1R_2R_3)$,
   Z is phosphorus, arsenic or antimony,
   R, $R_1$, $R_2$ and $R_3$ are alkyl, cycloalkyl, phenyl, benzyl, alkenyl, cyclo-alkenyl, or pyridyl groups.

2. The process of claim 1 in which one or more of $R_1$, $R_2$ and $R_3$ is an alkyl group containing 1 to 12 carbon atoms, a phenyl group or a benzyl group.

3. The process of claim 1 in which the temperature is in the range 20° to 130° C.

4. The process of claim 1 in which the pressure of hydrogen is up to 100 atmospheres.

5. The process of claim 1 in which the concentration of the iridium complex is in the range $10^{-5}$ to $10^{-1}$ molar.

6. The process of claim 1 in which the iridium complex is selected from the group consisting of

$IrH_3(PEt_2Ph)_2$ $IrH_3(P.Ph_3)_2$ and $IrH_3(P.Ph_3)_3$.

7. The process of claim 1 in which the aldehyde or ketone is hydrogenated in the presence of an iridium complex of formula $IrHY(OOC.R)L_n$ and a carboxylic acid containing at least two carbon atoms.

8. The process of claim 7 in which the carboxylic acid is acetic acid and the group (OOC.R) is $(OOC.CH_3)$.

9. The process of claim 7 in which the complex is formed in situ in the reaction medium by adding thereto a compound of formula $IrH_3(Z[R_1R_2R_3])_n$.

10. The process of claim 7 in which the aldehyde to be hydrogenated contains 4 to 14 carbon atoms and is in admixture with olefinic hydrocarbons.

11. The process of claim 7 in which the iridium complex is selected from the group consisting of $IrH_2(OOC.CH_3)(P.Ph_3)_3$

$IrH_2(OOC.CH_3)(P.Ph_3)_2CO$,  $IrH(OOC.CH_3)_2(P.Ph_3)_3$ and $IrH_2(OOC.C_2H_5)(AsPh_3)_3$.

References Cited

UNITED STATES PATENTS

| 3,110,747 | 11/1963 | Millineaux | 260—638 |
| 3,336,239 | 8/1967 | Bailey et al. | 260—638 |
| 3,394,195 | 7/1968 | Conley, Jr. et al. | 260—638 |

LORRAINE A. WEINBERGER, Primary Examiner

V. GARNER, Assistant Examiner

U.S. Cl. X.R.

260—465.1, 491, 618, 638, 666, 667, 683.9